United States Patent
Sahasrabudhe et al.

(10) Patent No.: US 9,266,608 B2
(45) Date of Patent: Feb. 23, 2016

(54) COMPENSATING FOR LEAD-LAG IN ROTOR SYSTEM

(71) Applicant: Sikorsky Aircraft Corporation, Stratfort, CT (US)

(72) Inventors: Vineet Sahasrabudhe, Cheshire, CT (US); Matthew A. White, Milford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 243 days.

(21) Appl. No.: 13/846,113

(22) Filed: Mar. 18, 2013

(65) Prior Publication Data

US 2014/0277855 A1    Sep. 18, 2014

(51) Int. Cl.
*G01C 23/00* (2006.01)
*B64C 27/57* (2006.01)

(52) U.S. Cl.
CPC ..................... *B64C 27/57* (2013.01)

(58) Field of Classification Search
None
See application file for complete search history.

(56) References Cited

U.S. PATENT DOCUMENTS

| 4,127,245 | A |   | 11/1978 | Tefft et al. |
| 4,330,829 | A |   | 5/1982 | Fischer et al. |
| 4,930,988 | A |   | 6/1990 | Griffith |
| 4,958,786 | A |   | 9/1990 | Ogawa et al. |
| 5,242,130 | A |   | 9/1993 | Mouille et al. |
| 5,428,543 | A | * | 6/1995 | Gold et al. ............ 701/5 |
| 6,189,836 | B1 |   | 2/2001 | Gold et al. |
| 2010/0023186 | A1 |   | 1/2010 | Sahasrabudhe et al. |
| 2011/0191040 | A1 | * | 8/2011 | Bechhoefer et al. ......... 702/56 |
| 2012/0116612 | A1 |   | 5/2012 | Andrews |
| 2014/0271188 | A1 | * | 9/2014 | Dillon .................. 416/1 |

OTHER PUBLICATIONS

International Search Report for application PCT/US14/24406, dated Nov. 18, 2014, 6 pages.
Written Opinion for application PCT/US14/24406, dated Nov. 18, 2014, 5 pages.

* cited by examiner

*Primary Examiner* — Adam Alharbi
(74) *Attorney, Agent, or Firm* — Cantor Colburn LLP

(57) ABSTRACT

A control system for a rotor assembly includes a plurality of sensors configured to detect a lead-lag rate of each rotor blade of a plurality of rotor blades rotatable around a shaft and a flight control computer configured to generate lead-lag compensation signals based on the detected lead rate and lag rate of each rotor blade to control each rotor blade.

14 Claims, 5 Drawing Sheets

COMPENSATING FOR LEAD-LAG IN ROTOR SYSTEM

BACKGROUND OF THE INVENTION

The subject matter disclosed herein relates to the art of rotary wing aircraft and, more specifically, to rotor systems for rotary wing aircraft.

Lead-lag is the forward and backward in-plane motion of the blades of an articulated rotor. The lead-lag dynamics of rotor blades tend to be very lightly damped because the primary damping force is caused by the drag, which is much lower than the lift forces. Two lead-lag rigid dynamical modes that tend to be under-damped are "regressive" and "progressive" lead-lag modes. The progressive lag mode occurs when the center of mass of the rotor is moving around the shaft in the same direction as the rotor rotation. The regressive lag mode occurs when the center of mass of the rotor is moving in the opposite direction as the rotor rotation. A phenomena known as "ground resonance" occurs when the frequency of the regressive lag mode becomes too close to the frequency of a coupled body-landing gear mode.

To provide sufficient damping for these lead-lag modes, supplementary mechanical dampers are typically used. These mechanical dampers are usually sized to prevent ground resonance. Lead-lag dampers tend to increase rotor system cost and decrease performance because they are complex, heavy, cause high hub drag, and require maintenance.

BRIEF DESCRIPTION OF THE INVENTION

According to one aspect of the invention, a control system for a rotor assembly includes a plurality of sensors configured to detect a lead-lag rate of each rotor blade of a plurality of rotor blades rotatable around a shaft. The control system further includes a flight control computer configured to generate lead-lag compensation signals based on the detected lead rate and lag rate of each rotor blade to control each rotor blade.

According to another aspect of the invention, a rotor control assembly includes a rotor control computer configured to receive as inputs detected lead-lag rates from sensors located on a plurality of rotor blades rotating around a rotor shaft, to generate a lead-lag compensation signal based on the detected lead-lag rates, and to generate a rotor blade control signal based on the lead-lag compensation signal.

According to another aspect of the invention, a method of controlling a rotor system includes detecting a lead-lag rate of each of a plurality of rotor blades, generating a lead-lag compensation signal based on the detected lead-lag rate and controlling the plurality of rotor blades based on the lead-lag compensation signal.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Lead and lag variations in rotor blade rotation can damage rotor components or couple with the body/landing gear dynamics and cause instabilities and damage. Embodiments of the invention relate to measuring lead-lag rates with sensors in rotor blades, or inferring the lead-lag rates from other signals in a rotating or fixed frame, and compensating for the measured lead-lag rates. However, it is understood that aspects of the invention can be used outside of preventing such damage.

Figure 1:
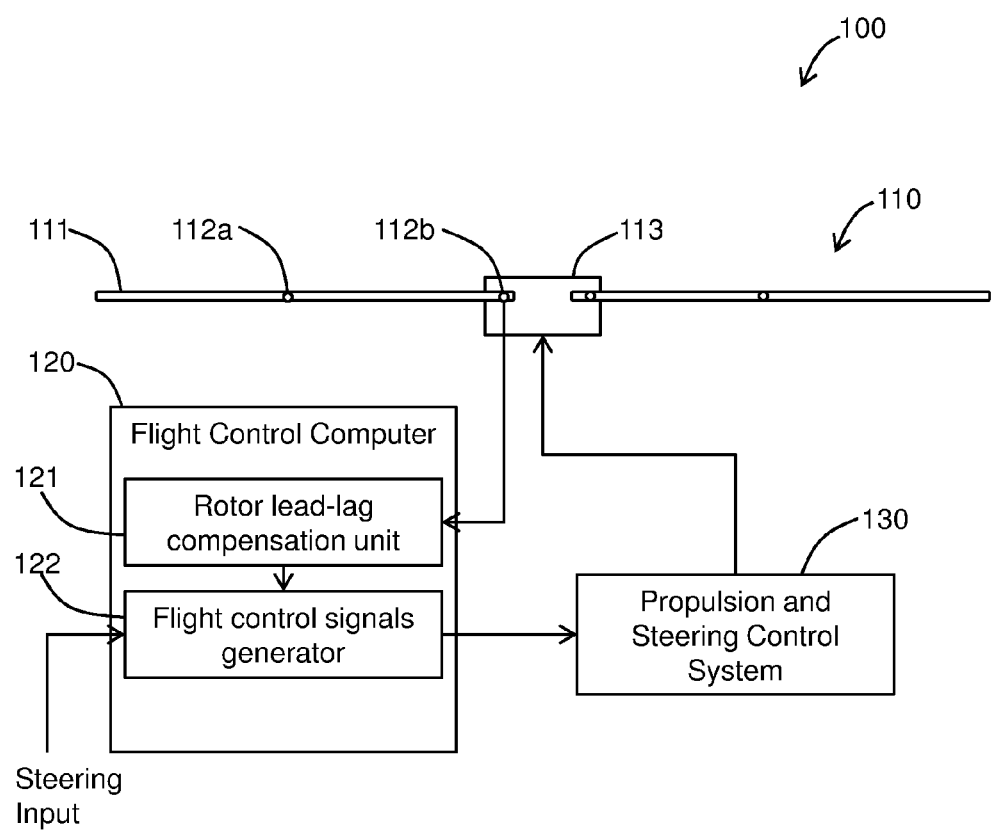
FIG. 1 is a block diagram of a rotor assembly according to an embodiment of the invention.

FIG. 1 illustrates a rotor assembly 100 according to an embodiment of the invention. The rotor assembly 100 includes a rotor blade system 110 including rotor blades 111, sensors 112a and 112b and a hub 113. The rotor assembly 100 includes a flight control computer 120 including a rotor lead-lag compensation unit 121 and a flight control signals generator 122. The rotor assembly 100 also includes a propulsion and steering control system 130 to control the rotation of the hub 113 and the lead, lag, and elevation of the rotor blades 111 using a swashplate.

In operation, the rotor blades 111 rotate around a hub 113, which is driven by a rotor shaft, which is in turn driven by the propulsion and steering control system 130. As shown, each rotor blade 111 has sensors 112a, 112b. The sensors 112a and 112b detect the lead-lag rates, or the lead-lag angles, of each of the blades 111. One or more sensors 112a may be located in or on the rotor blades 111, and one or more sensors 112b may be located in the hub 113. In embodiments of the invention, at least three rotor blades 111 are required to be monitored at a flight-critical level. Although embodiments of the invention encompass any combination of mechanical and electronic damping, and the rotor blades 111 may be monitored at a flight critical level or a level less than flight-critical. The sensors 112a and 112b may include any type of sensor, including accelerometers, optical sensors, magnetoresistive sensors and any other type of sensor capable of detecting changes of position of the rotor blades to detect lead and lag rates. The position and numbers of the sensors 112a and 112b can be varied from the example shown in FIG. 1.

The lead-lag measurements are transmitted to the rotor lead-lag compensation unit 121 of the flight control computer 120. The transmission can be via wired and/or wireless transmission paths. The lead-lag compensation unit 121 generates compensation signals based on the measured or inferred lead-lag measurements, rotor azimuth data and rotor rotation rate data. The compensation signals are transmitted to the flight control signals generator 122. The flight control signals generator 122 receives the compensation signals and steering input from one or more of a pilot and a piloting program. The resulting control signals are output to the propulsion and steering control system 130 to control the position of the rotor blades 111 using, by way of example, a swashplate.

The flight control computer 120 and propulsion and steering system 130 may include one or more computers 120 connected in a distributed manner. In other words, while the flight control computer 120 is illustrated as one block for purposes of description, embodiments of the invention encompass any number of computers including processors, control logic, memory and other circuitry connected by communications lines, either wirelessly or via wires. In addition, while the rotor lead-lag compensation unit 121 and flight control signals generator 122 are illustrated as separate blocks, embodiments of the invention encompass one computer system within one housing that include both the rotor lead-lag compensation unit 121 and the flight control signals generator 122. In aspects of the invention, such computer systems and/or processors may implement aspects of the invention using software and/or firmware encoded on one or more computer-readable media, such as hard disks, flash memory, other volatile or non-volatile memory, magnetic memory devices, solid-state memory devices or any other computer-readable media.

The propulsion and steering control system 130 includes any type of engine, motor or other propulsion system. In addition, the propulsion and steering control system 130 may include actuators to control the lead and lag or pitch of rotor blades 111 or any other steering mechanisms of an aircraft.

While FIG. 1 illustrates sensors that measure lead-lag rates, embodiments of the invention encompass any detection of lead-lag rates, including direct measurement by sensors located in rotor blades and inference of lead-lag rates based on measurements of aircraft characteristics, motor control signals, rotor hub characteristics or any other characteristics capable of providing data to infer a lead-lag rate of a rotor blade.

Figure 2:
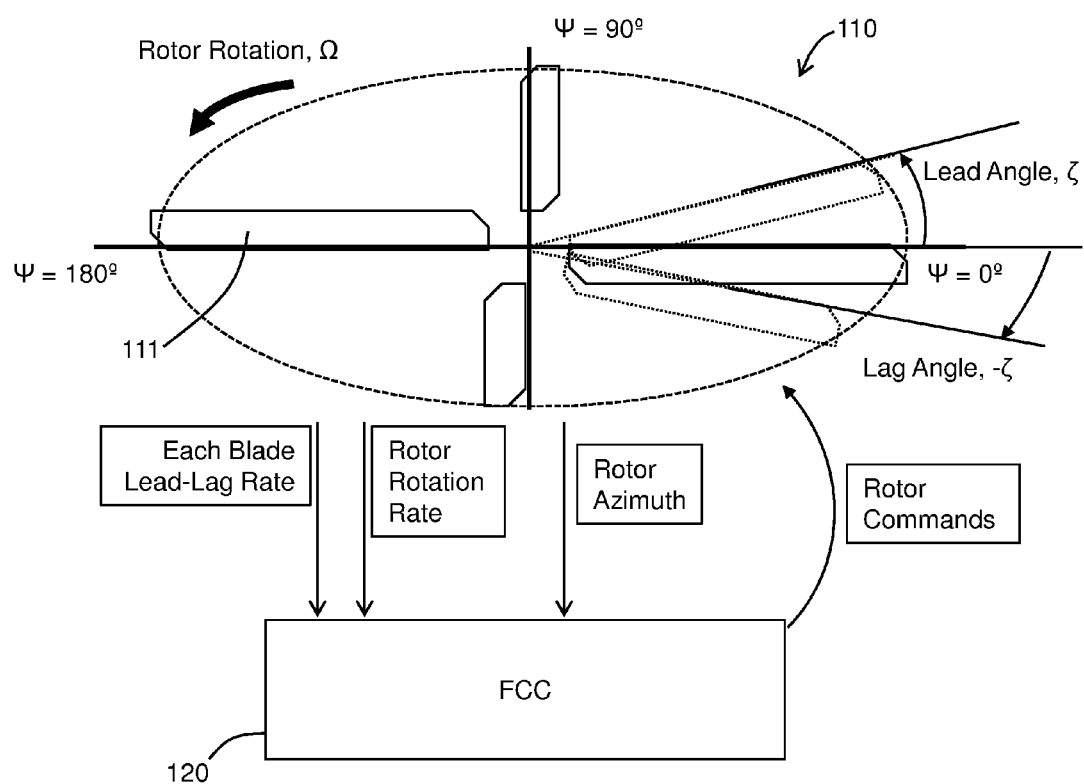
FIG. 2 is a functional diagram of controlling rotors according to an embodiment of the invention.

FIG. 2 illustrates the operation of the flight control computer 120 according to an embodiment of the invention. As illustrated in FIG. 2, sensors, such as the sensors 112a and 112b of FIG. 1, measure the lead-lag rate of each rotor blade 111, such as the rotor blades 111 of FIG. 1. For example, a sensor may detect a lead angle $\zeta$, or an angle that a rotor blade 111 precedes the rotor azimuth $\psi$, or the sensor may detect a lag angle $-\zeta$, which is an angle that a rotor blade 111 proceeds or lags behind the rotor azimuth $\psi$. The azimuth $\psi$ for each blade is the angle in the rotor rotation relative to the fixed fuselage frame, which cycles through 360 degrees. For example, as illustrated in FIG. 2, a rotor system 110 having four rotor blades 111 may have a rotor azimuth $\psi$ at each of zero degrees, ninety degrees, one hundred eighty degrees and two hundred seventy degrees. Referring to the rotor blade 111 having an azimuth $\psi$ at zero degrees, the lead-lag rate corresponds to an angle $\zeta$ that the rotor blade 111 leads the rotor azimuth $\psi$ of the zero lead-lag position of that blade by the angle $\zeta$ that the rotor blade 111. Accordingly, sensors that detect the lead-lag rate may include position sensors that compare a position of a rotor blade with a position of an azimuth $\psi$, rotation rate sensors that detect whether the lead angle $\zeta$ or lag angle $-\zeta$ of a rotor blade is increasing or decreasing, or any other type of sensor that can be used to infer the lead-lag angle or lead-lag rate.

The rotor rotation rate and a rotor azimuth may be measured by the same sensors that measure the lead-lag rate, or the different sensors may detect each parameter. In one embodiment, the rotor azimuth is measured by separate sensors than the lead-lag sensors. One example of a rotor azimuth sensor is a tooth-gap sensor that detects the presence or absence of teeth on a rotating electrical pickup to obtain a pulse corresponding to an azimuth position. However, embodiments of the invention encompass any type of position-detecting sensors. The flight control computer 120 receives as inputs the lead-lag rates for each blade 111, the rotor rotation rate and the rotor azimuth. The flight control computer 120 then generates rotor commands to control pitch of the blades of the rotor system 110, lead or lag controls of rotor blades 111 or flapping (elevation or declination) of the rotor blades 111.

Figure 3:
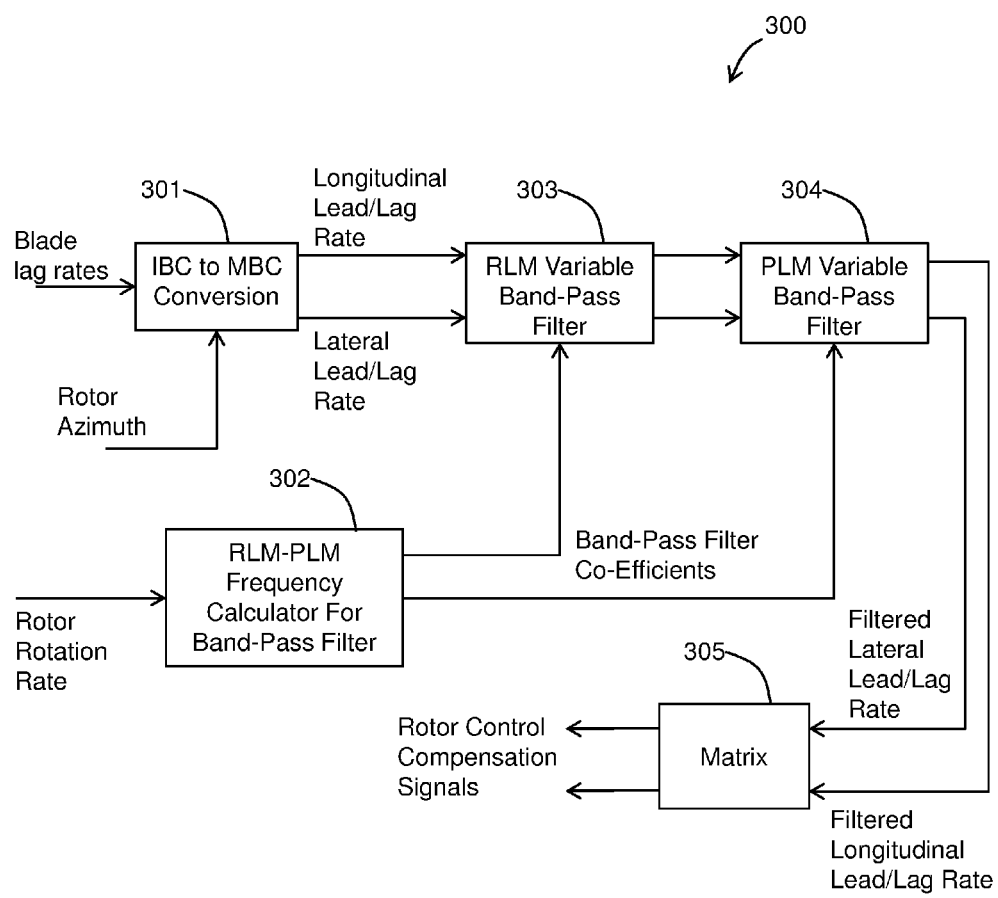
FIG. 3 is a block diagram of a flow diagram of a method of generating rotor control compensation signals according to an embodiment of a rotor assembly.

FIG. 3 illustrates in greater detail the generation of the lead-lag compensation signals. The operation of generating the lead-lag compensation signal may be executed by the rotor lead-lag compensation unit 121, for example. In an embodiment of the invention, blade lead-lag rates are measured by sensors located on a plurality of rotor blades, such as the sensors 112a and 112b on the rotor blades 111 of FIG. 1. In addition, the rotor azimuth is measured by one or more sensors, such as the sensors 112a or 112b of FIG. 1. In block 301, the blade lead-lag rates of the individual blades are converted into a longitudinal lead-lag rate and a lateral lead-lag rate by performing an individual blade coordinate (IBC) to multi-blade coordinate (MBC) conversion. As used in the present specification and claims, the IBC to MBC conversion is defined as a conversion of the sensor signals corresponding to each individual blade to composite signals representing a combination of the individual blade measurements.

In block 302, band-pass filter coefficients are generated by feeding a detected rotor rotation rate into a regressive-lag mode (RLM)—progressive lag mode (PLM) frequency calculator. The frequency of the RLM or PLM mode depends on how fast the rotor is turning (rotation rate) and the relationship between the rotation rate and the frequency of the RLM and PLM modes is known. As discussed above, in one embodiment, the rotation rate of the rotor is measured with a tooth-gap sensor that detects the presence or absence of teeth on a rotating electrical pickup to obtain a pulse corresponding to an azimuth position. However, embodiments of the invention encompass any type of position-detecting sensors. As such, the RLM and PLM modes can be stored in a database indexed to a measured rotation rate of the rotor or may be calculated as needed. Accordingly, by measuring the rotor rotation rate, the RLM and PLM frequencies may be calculated.

The longitudinal lead-lag rate and lateral lead-lag rate are input into an RLM variable band-pass filter 303 and a PLM variable band-pass filter 304 having band-pass frequencies determined by the band-pass filter co-efficients. In one embodiment, the filtered lateral lead-lag rate signal and the filtered longitudinal lead-lag rate signal are used directly to generate rotor control compensation signals. For example, the filtered lateral lead-lag rate signal and the filtered longitudinal lead-lag rate signal may be used directly, without passing through the matrix 305, to generate lateral and longitudinal swashplate control signals, respectively.

In the embodiment illustrated in FIG. 3, the filtered lateral lead-lag rate signal and the filtered longitudinal lead-lag rate signal are passed through the matrix 305, which may be a transformation matrix, such as an identity matrix. The matrix 305 may at least partially combine the filtered longitudinal lead-lag rate signal with the filtered lateral lead-lag rate signal. During operation, changes in a lateral position of the rotor blades 111 may affect the longitudinal lead-lag rate, and changes in a longitudinal position of the rotor blades may affect the lateral lead-lag rate. Accordingly, the filtered lateral lead-lag rate may be combined with the filtered longitudinal lead-lag rate at a predetermined rate or in a predetermined proportion based on the observed or measured relationship between the lateral and longitudinal lead and lag of the rotor blades.

Figure 4:
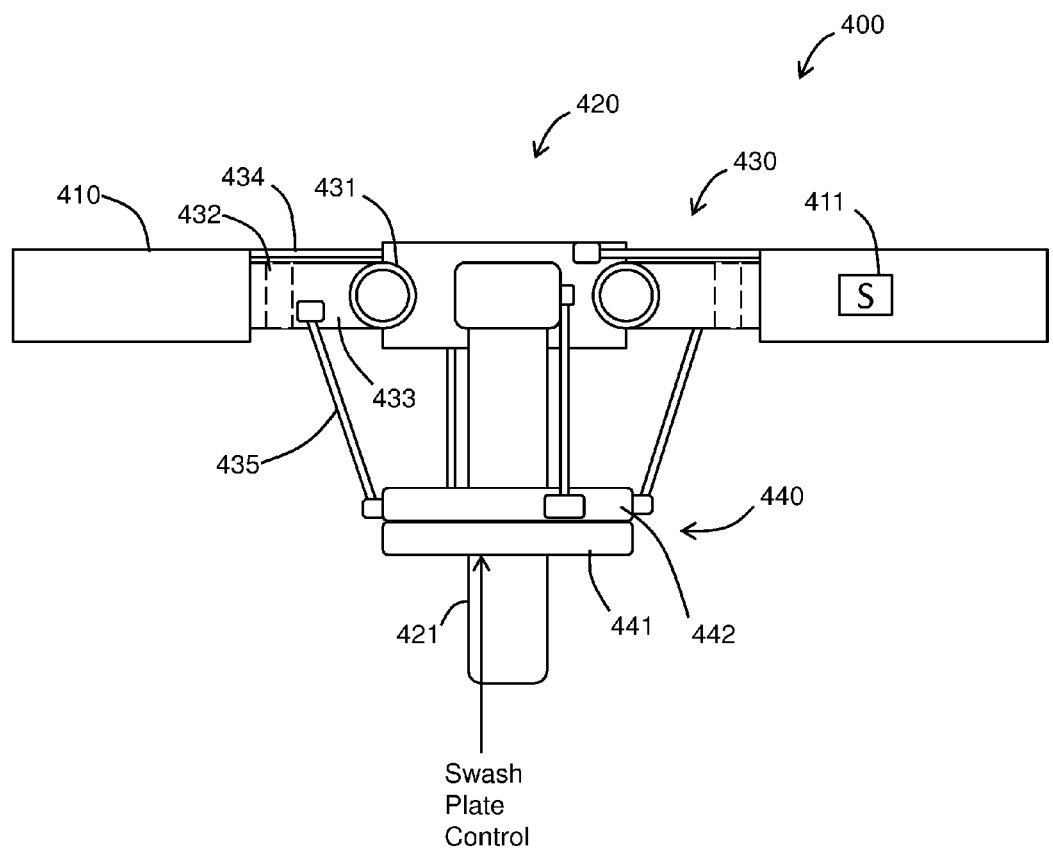
FIG. 4 illustrates a rotor blade assembly according to an embodiment of the invention.

FIG. 4 illustrates an example of a rotor blade assembly 400 according to an embodiment of the invention. The rotor blade assembly 400 includes rotor blades 410, a rotor hub 420, rotor hinge assembly 430 and swash plate assembly 440. The rotor blades 410 shown in FIG. 4 include sensors 411 located on or in the rotor blades 410, although the location and number of sensors 411 is not restricted to the shown example. The rotor blades 410 are connected to the rotor hub 420, which rotates with a rotor shaft 421. The hinge assembly 430 includes a horizontal hinge 431 configured to elevate and lower the rotor blades 410 and vertical hinges 432 configured to adjust the lead and lag of the rotor blades 410. A connector 433 is positioned between the hinges 431 and 432. Although hinges 431 and 431 are illustrated in FIG. 4, it is understood that such hinges are provided by way of example and embodiments of the invention are not limited to structures having such hinges Actuators 434 are actuated to directly control the lead and lag of the rotor blades 410, and actuators 435 are actuated to directly control the pitch of the rotor blades 410. One end of the actuators 435 is connected to a rotating plate 442 of the swashplate assembly 440. The swashplate assembly 440 includes a base plate 441 that does not rotate with the rotor blades 410 and a rotating plate 442 that rotates with the rotor blades 410. The base plate 441 may be controlled to change its inclination angle, which actuates the actuators 435 to change the pitch of the rotor blades 410.

In embodiments of the present invention, the measurements from the sensors 411 in or on the rotor blades 410 are transmitted, either by a wire or conductive lines along the rotor blades 410 and the shaft 421 or wirelessly, to a flight control computer 120. The flight control computer 120 generates control signals, such as the swashplate control signals, to control the rotor blades 410 to compensate for detected lead and lag of the rotor blades 410.

FIG. 4 illustrates a fully articulated rotor blade assembly 400 in which each rotor blade 410 is separately controllable. The rotor blades 410 are allowed to flap, feather, and lead or lag independently of each other. While one horizontal hinge 431 and one vertical hinge 432 are illustrated in FIG. 4, embodiments of the present invention encompass any number and any type of horizontal and vertical hinges 431 and 432. In addition, while actuators 434 and 435 are illustrated for purposes of description, it is understood that the actuators for actuating the hinges 431 and 432 may include actuators of any shape and any type, including mechanically, electrically and pneumatically-controlled. In addition, embodiments of the invention include a rotor blade assembly 400 including dampers to prevent excess lead and lag movement of the rotor blades 410.

Figure 5:
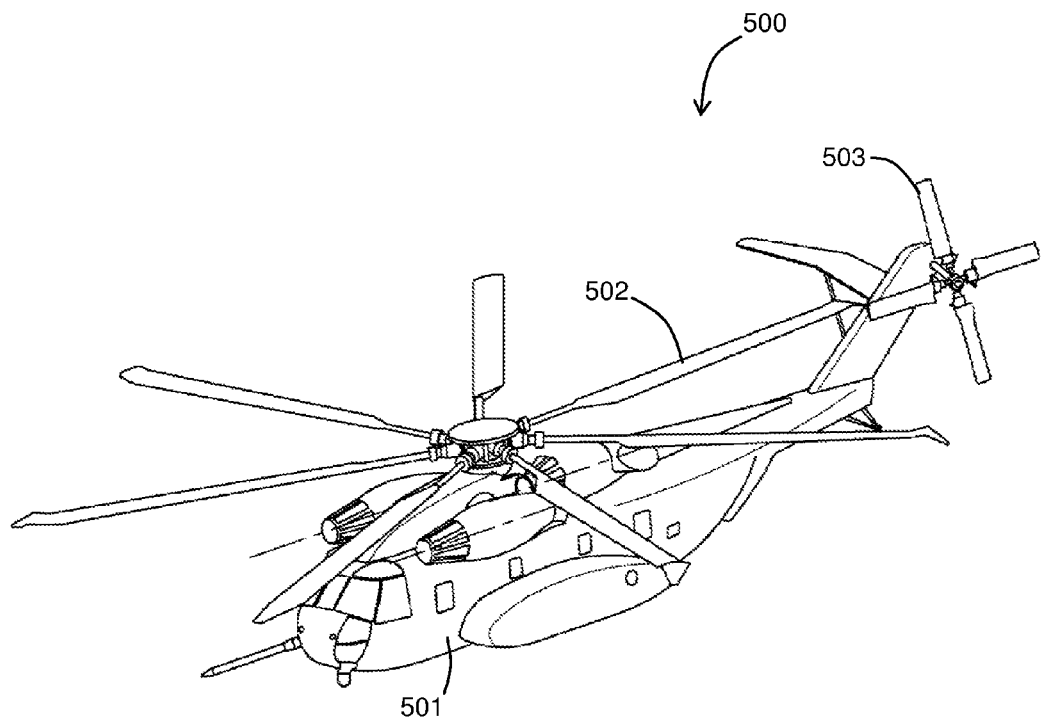
FIG. 5 illustrates a rotary wing aircraft according to an embodiment of the invention.

FIG. 5 illustrates an example of a rotary-wing aircraft 500 according to an embodiment of the invention. The aircraft 500 includes a fuselage 501, horizontal rotor blades 502 and vertical rotor blades 503. In embodiments of the invention, a flight control computer, such as the flight control computer 120 of FIG. 1, may receive as inputs lead-lag rates of the horizontal rotor blades 502 or the vertical rotor blades 503. The flight control computer may also receive rotation rate data and rotor azimuth data of the rotor blades 502 or 503. The flight control computer then generates rotor control signals to control one or both of the horizontal rotor blades 502 and vertical rotor blades 503 to compensate for lead-lag rates of the horizontal and vertical rotor blades 502 and 503.

In embodiments of the invention, sensors in rotor blades are used to measure the lead and lag of rotor blades. The lead and lag measurements are passed through filters to generate compensation signals, and the compensation signals are used to control rotor blades to reduce the lead and lag of the rotor blades. However, it is understood that other locations for the sensors may be used, such as a sensor located on the hub that remotely senses the position of the rotor blades, or any other location. Further, while shown for purposes of illustration in the context of a single main rotor, it is understood that aspects can be used with coaxial rotor systems.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A control system for a rotor assembly comprising:
a plurality of sensors configured to detect a lead-lag rate of each rotor blade of a plurality of rotor blades rotatable around a shaft; and
a flight control computer configured to generate lead-lag compensation signals based on the detected lead rate and lag rate of each rotor blade to control each rotor blade;
wherein the flight control computer is configured to convert the detected lead-lag rate of each rotor blade into a composite longitudinal lead-lag rate signal and a composite lateral lead-lag rate signal by performing an individual blade coordinate to multi-blade coordinate conversion;
wherein the flight control computer is configured to generate a filtered longitudinal lead-lag rate signal and a filtered lateral lead-lag rate signal by passing the composite longitudinal lead-lag rate signal and the composite lateral lead-lag rate signal through a regressive lag mode band-pass filter and a progressive lag mode variable band-pass filter, and
the flight control computer is configured to generate the lead-lag compensation signals based on the filtered longitudinal lead-lag rate signal and the filtered lateral lead-lag rate signal.

2. The rotor assembly of claim 1, wherein the flight control computer is configured to detect a rotational rotor rate of the plurality of rotor blades, to generate band-pass filter coefficients by passing the rotational rotor rate through a regressive lag mode-progressive lag mode frequency calculator, and to provide the band-pass filter coefficients to the regressive lag mode band-pass filter and the progressive lag mode variable band-pass filter, respectively.

3. The rotor assembly of claim 1, wherein the flight control computer is configured to generate the lead-lag compensation signals by passing the filtered longitudinal lead-lag rate signal and the filtered lateral lead-lag rate signal through a transformation matrix to combine portions of the filtered longitudinal lead-lag rate signal and the filtered lateral lead lag rate signal.

4. The rotor assembly of claim 1, further comprising a swashplate to control a position of the plurality of rotor blades,
wherein the flight control computer is configured to generate swashplate control signals based on the lead-lag compensation signals.

5. A rotor control assembly, comprising:
a rotor control computer configured to receive as inputs detected lead-lag rates from sensors located on a plurality of rotor blades rotating around a rotor shaft, to generate a lead-lag compensation signal based on the measured lead-lag rates, and to generate a rotor blade control signal based on the lead-lag compensation signal;

wherein the rotor control computer is configured to convert the detected lead-lag rate of each rotor blade into a composite longitudinal lead-lag rate signal and a composite lateral lead-lag rate signal by performing an individual blade coordinate to multi-blade coordinate conversion;

wherein the rotor control computer is configured to generate a filtered longitudinal lead-lag rate signal and a filtered lateral lead-lag rate signal by passing the composite longitudinal lead-lag rate signal and the composite lateral lead-lag rate signal through a regressive lag mode band-pass filter and a progressive lag mode variable band-pass filter, and the flight control computer is configured to generate the lead-lag compensation signals based on the filtered longitudinal lead-lag rate signal and the filtered lateral lead-lag rate signal.

6. The rotor control assembly of claim 5, wherein the rotor control computer is configured to detect a rotational rotor rate of the plurality of rotor blades, to generate band-pass filter coefficients by passing the rotational rotor rate through a regressive lag mode-progressive lag mode frequency calculator, and to provide the band-pass filter coefficients to the regressive lag mode band-pass filter and the progressive lag mode variable band-pass filter, respectively.

7. The rotor control assembly of claim 5, wherein the rotor control computer is configured to generate the lead-lag compensation signals by passing the filtered longitudinal lead-lag rate signal and the filtered lateral lead-lag rate signal through an identity matrix to combine portions of the filtered longitudinal lead-lag rate signal and the filtered lateral lead lag rate signal.

8. The rotor control assembly of claim 5, wherein the rotor control computer is configured to generate swashplate control signals based on the lead-lag compensation signals, the swashplate control signals controlling a position of the plurality of rotor blades.

9. A method of controlling a rotor system, the method comprising:
   detecting a lead-lag rate of each of a plurality of rotor blades;
   generating a lead-lag compensation signal based on the detected lead-lag rate; and
   controlling the plurality of rotor blades based on the lead-lag compensation signal;
   wherein generating the lead-lag compensation signal includes converting the calculated lead-lag rate of each rotor blade into a composite longitudinal lead-lag rate signal and a composite lateral lead-lag rate signal by performing an individual blade coordinate to multi-blade coordinate conversion;
   wherein generating the lead-lag compensation signal comprises:
   generating a filtered longitudinal lead-lag rate signal and a filtered lateral lead-lag rate signal by passing the composite longitudinal lead-lag rate signal and the composite lateral lead-lag rate signal through a regressive lag mode band-pass filter and a progressive lag mode variable band-pass filter; and
   generating the lead-lag compensation signals based on the filtered longitudinal lead-lag rate signal and the filtered lateral lead-lag rate signal.

10. The method of claim 9, wherein generating the lead-lag compensation signal further comprises:
    detecting a rotational rotor rate of the plurality of rotor blades;
    generating band-pass filter coefficients by passing the rotational rotor rate through a regressive lag mode-progressive lag mode frequency calculator; and
    providing the band-pass filter coefficients to the regressive lag mode band-pass filter and the progressive lag mode variable band-pass filter, respectively.

11. The method of claim 9, wherein generating the lead-lag compensation signal further comprises:
    generating a mixed longitudinal lead-lag rate signal and a mixed lateral lead-lag rate signal by passing the filtered longitudinal lead-lag rate signal and the filtered lateral lead-lag rate signal through an identity matrix to mix the filtered longitudinal lead-lag rate signal with the filtered lateral lead lag rate signal; and
    generating the lead-lag compensation signals based on the mixed longitudinal lead-lag rate signal and the mixed lateral lead-lag rate signal.

12. The method of claim 9, further comprising:
    controlling a swashplate of the rotor system based on the lead-lag compensation signals.

13. A computer readable medium encoded with processing instructions to implement the method of claim 9 using one or more processors.

14. A rotary wing aircraft comprising a fuselage, a rotor assembly connected to the fuselage, and the control system of claim 1 to control the blades rotating about the shaft of the rotor assembly.

* * * * *